(12) United States Patent
Chern et al.

(10) Patent No.: US 9,686,839 B1
(45) Date of Patent: Jun. 20, 2017

(54) LIGHTING APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 0 days.

(21) Appl. No.: 15/075,857

(22) Filed: Mar. 21, 2016

Related U.S. Application Data

(60) Provisional application No. 62/260,449, filed on Nov. 27, 2015.

(51) Int. Cl.

| | | |
|---|---|---|
| *H05B 37/02* | (2006.01) | |
| *F21V 5/04* | (2006.01) | |
| *F21V 23/00* | (2015.01) | |
| *G02B 27/30* | (2006.01) | |
| *F21Y 115/10* | (2016.01) | |
| *F21Y 115/15* | (2016.01) | |

(52) U.S. Cl.
CPC ........... *H05B 37/0227* (2013.01); *F21V 5/04* (2013.01); *F21V 23/003* (2013.01); *G02B 27/30* (2013.01); *H05B 37/029* (2013.01); *F21Y 2115/10* (2016.08); *F21Y 2115/15* (2016.08)

(58) Field of Classification Search
CPC ........... H05B 37/00; H05B 37/02; F21K 9/00; H04N 9/3111; H04N 9/3164; H04N 9/3167; H04N 5/2254; H04N 5/23238
USPC ................... 362/221, 227, 240, 311.02, 800; 359/290–296; 315/307, 297, 312, 360
See application file for complete search history.

(56) References Cited

U.S. PATENT DOCUMENTS

| | | | |
|---|---|---|---|
| 6,252,623 B1 * | 6/2001 | Lu | G01B 11/25 348/42 |
| 6,392,742 B1 * | 5/2002 | Tsuji | G03F 7/70183 250/492.2 |
| 7,561,322 B1 * | 7/2009 | Maeda | G03B 21/005 359/290 |
| 9,048,633 B2 * | 6/2015 | Gronenborn | B23K 26/0608 |
| 9,125,253 B2 * | 9/2015 | Woodgate | F21V 23/0471 |
| 2016/0072258 A1 * | 3/2016 | Seurin | H04N 13/0296 348/46 |
| 2017/0041536 A1 * | 2/2017 | Chern | H04N 5/23238 |

* cited by examiner

*Primary Examiner* — Haissa Philogene
(74) *Attorney, Agent, or Firm* — Muncy, Geissler, Olds & Lowe, P.C.

(57) ABSTRACT

A lighting apparatus includes a structured light generation unit and a controlling unit. The structured light generation unit includes plural light sources and an optical element group. After plural light beams from the plural light sources pass through the optical element group, a first structured light pattern corresponding to a first light source is projected on a first position of the projection surface and a second structured light pattern corresponding to a second light source is projected on a second position of the projection surface. The first position and the second position are different. The controlling unit controls the first light source and the second light source to emit the light beams according to a time sequence. Consequently, the first structured light pattern and the second structured light pattern are projected on the projection surface according to the time sequence.

24 Claims, 10 Drawing Sheets

LIGHTING APPARATUS

CROSS-REFERENCE TO RELATED APPLICATION

This application claims priority to U.S. Provisional Patent Application No. 62/260,449 entitled "LIGHTING APPARATUS" filed Nov. 27, 2015, the contents of which are incorporated herein by reference.

FIELD OF THE INVENTION

The present invention relates to a lighting apparatus, and more particularly to a lighting apparatus for projecting a structured light pattern.

BACKGROUND OF THE INVENTION

A structured light is a light with a specified pattern. With increasing development of optical technologies, the structured light is designed to have a linear pattern, a planar pattern, a grid pattern or even a complicated light pattern. Consequently, the structured light can be applied to many fields such as 3D contour regeneration technologies, distance measurement technologies, anti-counterfeiting recognition technologies, motion sensitive technologies, novel appearance designs and associated applications. For example, by using the structured light, the conventional warning signs can be extensively applied to medical applications or biomedical applications that require pollution-free environments. In other words, the importance of the structured light is progressively increased and the associated technologies are widely explored.

Generally, a structured light generation unit is used for generating a structured light. There are basically two types of structured light generation units, i.e., with or without moving part. The moving part, e.g., by a MEMS or by a rotator which is a mechanical mechanism, could change light pattern. When the structured light is projected on an object, a structured light pattern is formed on a surface of the object. The structured light pattern on the surface of the object is an important identification feature for judging the spatial information. However, regardless of whether the structured light pattern provided by any commercially available lighting apparatus is a linear pattern, a planar pattern or a grid pattern, the projected position of the structured light pattern on the surface of the object does not vary with time for fixed pattern type, i.e., without moving part. Consequently, the corresponding projection area or resolution is limited, or the projected contents of the structured light pattern are not distinguished enough for spatial information extraction or indication. Under this circumstance, the applications of the structured light pattern are restricted, and thus the structured light pattern cannot be used in the subsequent process of precisely calculating the spatial information. These issues can be solved by using moving parts such that the lighting pattern is changed and hence the spatial information is further resolved. Nevertheless, there are still some drawbacks. For example, in case that a microelectromechanical system is used to generate the structure light pattern with the assistance of a movable optical module, the power consumption is generally very high. Moreover, since the demands on the assembling tolerances of the moving parts are stringent, the production yield is low and the durability is impaired. In other words, the conventional lighting apparatus which is with or without moving parts still needs to be improved.

SUMMARY OF THE INVENTION

For solving the drawbacks of the conventional technologies, the present invention provides a lighting apparatus for projecting a structured light pattern on different positions of a projection surface according to a time sequence. The structured light pattern can provide sufficient resources for precisely calculating the spatial information in order to increase the resolution.

For solving the drawbacks of the conventional technologies, the present invention provides a lighting apparatus for projecting one or many structured light patterns on a projection surface according to a sequence of power on-and-off on the corresponding light source respectively. The structured light pattern can provide sufficient resources for precisely calculating the spatial information in order to increase the resolution.

For solving the drawbacks of the conventional technologies, the present invention provides a lighting apparatus for projecting a structured light pattern without the need of using moving parts. Consequently, the power consumption is reduced, and the assembling yield and the durability are increased.

In accordance with an aspect of the present invention, there is provided a lighting apparatus. The lighting apparatus includes a structured light generation unit and a controlling unit. The structured light generation unit includes plural light sources and an optical element group. After plural light beams from the plural light sources pass through the optical element group, a first structured light pattern corresponding to a first light source of the plural light sources is projected on a first position of the projection surface and a second structured light pattern corresponding to a second light source of the plural light sources is projected on a second position of the projection surface. The first position and the second position are different. The controlling unit is in communication with the structured light generation unit. The controlling unit controls the first light source and the second light source to emit the light beams according to a time sequence, so that the first structured light pattern and the second structured light pattern are projected on the projection surface according to the time sequence.

In an embodiment, the controlling unit is programmable to turn on and turn off each of the plural light sources.

In an embodiment, the plural light sources are arranged in a linear permutation, and the plural light sources are alternatively and periodically turned on and turned off along a sequence of the linear permutation under control of the controlling unit. Alternatively, the plural light sources are arranged in a linear permutation, and the plural light sources are periodically turned on and turned off not along a sequence of the linear permutation under control of the controlling unit.

In an embodiment, the plural light sources are arranged in a circular permutation, and the plural light sources are alternatively and periodically turned on and turned off along a sequence of the circular permutation under control of the controlling unit. Alternatively, the plural light sources are arranged in a circular permutation, and the plural light sources are periodically turned on and turned off not along a sequence of the circular permutation under control of the controlling unit.

In an embodiment, the plural light sources are regularly arranged on a two-dimensional plane, or the plural light sources are regularly arranged on a three-dimensional curvy surface or in a three-dimensional space.

In an embodiment, the light source includes a laser diode, a light emitting diode, an organic light emitting diode and/or a thermal source.

In an embodiment, the optical element group includes plural optical elements corresponding to the first structured light pattern and the second structured light pattern. Each of the plural optical elements comprises a diffractive optical element, a refractive optical element, a reflective optical element, or a mixed of above mentioned.

In an embodiment, the refractive optical element is a multi-aperture lens, a lenticular lens or a lens array.

In an embodiment, a number of the plural optical elements is equal to a number of the plural light sources. The plural optical elements are aligned with the plural light sources, respectively.

In an embodiment, a number of the plural non-optical elements or optically-absorbed elements are inserted correspondingly with a number of the plural light sources and the plural optical elements to block the stray light respectively.

In an embodiment, the structured light generation unit further includes plural collimating lenses. Each of the plural collimating lenses is arranged between the corresponding light source and the optical element group. After the light beams from the corresponding light source is collimated by the corresponding collimating lens, the collimated light beams are directed to the optical element group.

In an embodiment, a linear distance between a light-outputting side of the optical element group and the plural light sources is smaller than 7 mm, or an overall height of the lighting apparatus is smaller than 7 mm.

In an embodiment, the lighting apparatus further includes a casing, and the optical element group is supported by a casing. There is a fixed relative configuration or a fixed distance between the optical element group and the plural light sources. Alternatively, the relative configuration or the relative distance between the optical element group and the plural light sources is adjusted in a programmable manner.

In an embodiment, the lighting apparatus further includes a sensing unit. After the first structured light pattern and the second structured light pattern on different positions of the projection surface are sensed by the sensing unit, a sensing signal is generated by the sensing unit.

In an embodiment, the controlling unit is programmable to turn on and turn off each of the plural light sources according to the sensing signal.

In an embodiment, the plural light sources are disposed on a circuit protection layer, and the plural light sources are electrically connected with the circuit protection layer. The plural light sources are thermally stabilized by the circuit protection layer, or the plural light sources are not thermally stabilized by the circuit protection layer.

In an embodiment, the plural light sources and the controlling unit are disposed on a circuit protection layer, and the plural light sources and the controlling unit are electrically connected with the circuit protection layer. The plural light sources and the controlling unit are thermally stabilized by the circuit protection layer, or the plural light sources and the controlling unit are not thermally stabilized by the circuit protection layer.

In an embodiment, the plural light sources and the controlling unit are disposed on a circuit protection layer, the plural light sources and the controlling unit are electrically connected with the circuit protection layer, and at least one sensor is disposed on the circuit protection layer for generating a sensing signal to the controlling unit. The plural light sources, the controlling unit and the at least one sensor are thermally stabilized by the circuit protection layer, or the plural light sources, the controlling unit and the at least one sensor are not thermally stabilized by the circuit protection layer.

In an embodiment, the lighting apparatus further comprises a casing, and the optical element group and the casing are integrally formed by inserted molding, two color molding, UV light curving, or a thermal curving.

In an embodiment, the optical element group and the casing are integrally formed by inserted molding, two color molding, UV light curving, or a thermal curving and thermally resistant to a high temperature in a reflow process.

In an embodiment, the optical element group is a film or thin optical element which is comprised of a surface of collimating lens array or microlens array while on the other side is a surface of diffractive element array.

In an embodiment, the thickness of the optical element group is less than 0.4 mm.

In an embodiment, the body of casing is with alignment pins or a mechanical structure for hardness enhancement.

In an embodiment, the body of the casing is doping with electromagnetic interference reduction materials.

In an embodiment, the body of casing with mechanical structure is used for stray light reduction.

From the above descriptions, the lighting apparatus comprises plural light sources that are programmable to emit light beams. According to a time sequence, the structured light patterns are sequentially projected on different positions of the projection surface, or the structured light patterns have different profiles. Consequently, the structured light pattern can provide sufficient resources for precisely calculating the spatial information in order to increase the resolution. Under this circumstance, the applications of the structured light pattern are expanded. In comparison with the conventional technology of using the microelectromechanical system to drive the movable optical module, the lighting apparatus of the present invention does not need moving parts. Consequently, the power consumption is largely reduced, the assembling yield is increased, the durability is enhanced, and the overall volume is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
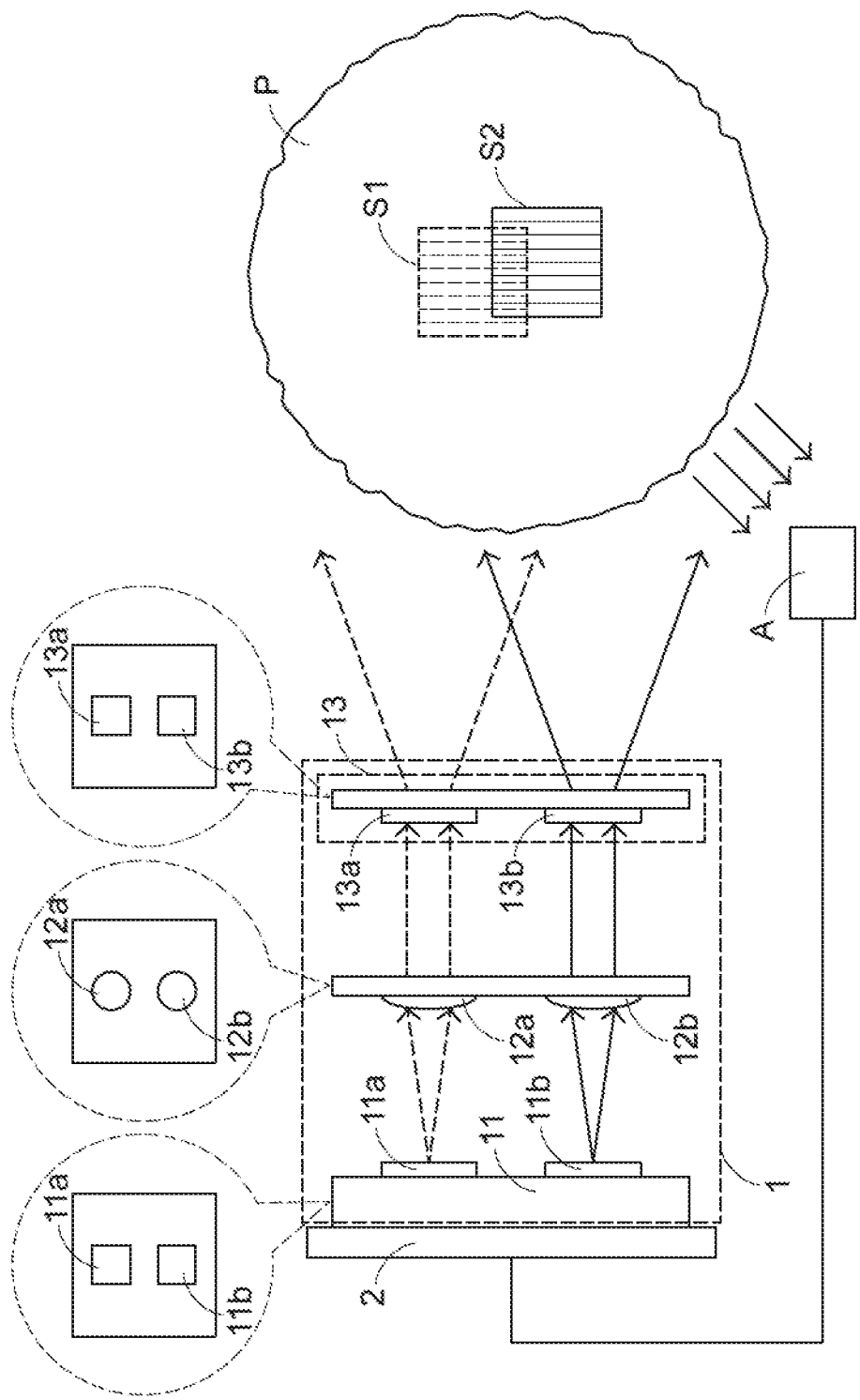
FIG. 1 schematically illustrates the operating concept of a lighting apparatus according to a first embodiment of the present invention.

FIG. 1 schematically illustrates the operating concept of a lighting apparatus according to a first embodiment of the present invention.

In this embodiment, the lighting apparatus comprises a structured light generation unit 1 and a controlling unit 2. The controlling unit 2 is in communication with the structured light generation unit 1 in order to control the lighting sequence of the structured light generation unit 1. The structured light generation unit 1 comprises plural light sources and an optical element group 13. After the light beams generated by each of the light sources pass through the optical element group 13, a corresponding structured light pattern is projected out. In this embodiment, the plural light sources comprise two light sources 11a and 11b. It is noted that the number of the light sources is not restricted. In addition, the optical element group 13 is a film or thin optical element which is comprised of a surface of collimating lens array or microlens array while on the other side is a surface of diffractive element array. In a preferred embodiment, the thickness of the optical element group 13 is less than 0.4 mm.

As shown in FIG. 1, the structured light generation unit 1 comprises the first light source 11a, the second light source 11b and the optical element group 13. After the light beams from the first light source 11a and the second light source 11b pass through the optical element group 13, the corresponding structured light patterns are externally projected on a projection surface P (e.g., a surface of an object). The first light source 11a and the second light source 11b are arranged side by side and disposed on a circuit substrate 11. In FIG. 1, the first light source 11a and the second light source 11b circumscribed by the balloon-shaped line from the circuit substrate 11 are taken along another viewpoint. The positions of the first light source 11a and the second light source 11b on the two-dimensional plane, on a three-dimensional curvy surface or in the three-dimensional space are different. Consequently, a first structured light pattern S1 is projected on a first position of the projection surface P after the light beams from the first light source 11a pass through the optical element group 13, and a second structured light pattern S2 is projected on a second position of the projection surface P after the light beams from the second light source 11b pass through the optical element group 13.

The controlling unit 2 is in communication with the circuit substrate 11. The controlling unit 2 is programmable to control the first light source 11a and the second light source 11b to emit light beams according to a time sequence. Consequently, the first structured light pattern S1 and the second structured light pattern S2 are projected on the projection surface P according to the time sequence. In other words, the visual positions are correspondingly changed. Consequently, the lighting apparatus for providing diverse structured light patterns and a sensing unit can be cooperatively used in the subsequent processing operations and applications to precisely calculate the spatial information. The operating principles about the cooperation of the lighting apparatus and the sensing unit will be described later.

Figure 2:
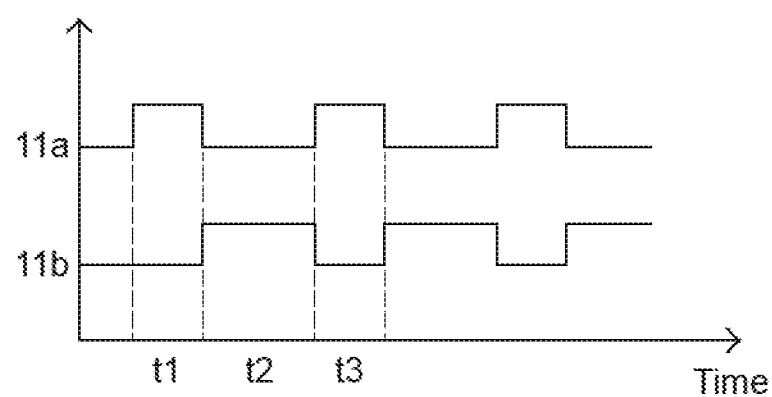
FIG. 2 is a schematic timing waveform diagram illustrating the on/off states of the first light source and the second light source of the lighting apparatus according to the first embodiment of the present invention.

Hereinafter, the method of controlling the first light source 11a and the second light source 11b to emit light beams according to the time sequence will be illustrated with reference to FIG. 2. FIG. 2 is a schematic timing waveform diagram illustrating the on/off states of the first light source and the second light source of the lighting apparatus according to the first embodiment of the present invention. In the time interval t1, the first light source 11a is in the on state, and the second light source 11b is in the off state. In the time interval t2, the first light source 11a is in the off state, and the second light source 11b is in the on state. In the time interval t3, the first light source 11a is in the on state, and the second light source 11b is in the off state. Consequently, the first light source 11a and the second light source 11b alternately emit light beams according to this time sequence. In other words, the first structured light pattern S1 and the second structured light pattern S2 are alternately projected on the first position and the second position of the projection surface P. In this embodiment, the time interval corresponding to the on state of the first light source 11a and the time interval corresponding to the on state of the second light source 11b are not overlapped with each other. In FIG. 1, the first structured light pattern S1 on the projection surface P are indicated by dotted lines, and the second structured light pattern S2 on the projection surface P are indicated by solid lines. That is, at this time point, the first light source 11a stops emitting light beams, but the second light source 11b emits light beams and projects the second structured light pattern S2 on the projection surface P. It is noted that numerous modifications and alterations may be made while retaining the teachings of the invention. For example, in some embodiments, the time interval corresponding to the on state of the first light source 11a and the time interval corresponding to the on state of the second light source 11b are partially overlapped with each other.

The optical element group 13 comprises one or more optical elements. After the light beams from each of the first light source 11a and the second light source 11b pass through the corresponding optical element, the light beams are projected out to generate the corresponding structured light pattern. In this embodiment, the number of optical elements is equal to the number of the light sources. That is, the optical element group 13 comprises two optical elements, including a first optical element 13a and a second optical element 13b. The first light source 11a and the second light source 11b are aligned with the first optical element 13a and the second optical element 13b, respectively. Moreover, the profiles of the structured light patterns are determined according to the patterns of the optical elements 13a and 13b. The first structured light pattern S1 is generated after the light beams pass through the first optical element 13a. The second structured light pattern S2 is generated after the light beams pass through the second optical element 13b. In this embodiment, the pattern of the first optical element 13a and the pattern of the second optical element 13b are identical. Consequently, the profile of the first structured light pattern S1 and the profile of the second structured light pattern S2 are identical. For clarification and brevity, the first structured light pattern S1 and the second structured light pattern S2 as shown in FIG. 1 are illustrated with plural straight lines. However, the projected positions of the first structured light pattern S1 and the second structured light pattern S2 are different. The examples of the first structured light pattern S1 and the second structured light pattern S2 are presented herein for purpose of illustration and description only.

The optical element is one of a diffractive optical element (DOE), a refractive optical element and a reflective optical element. The refractive optical element is a multi-aperture lens, a lenticular lens or a lens array. Moreover, the optical element group 13 is supported by a casing (not shown). Consequently, there is a fixed relative configuration or a fixed distance between the optical element group 13 and the light source 11a (or 11b). Alternatively, the relative configuration or the relative distance between the optical element group 13 and the light source 11a (or 11b) can be adjusted in a programmable manner. In an embodiment, the linear distance between a light-outputting side of the optical element group 13 and the light source 11a (or 11b) is smaller than 7 mm, or the overall height of the lighting apparatus is smaller than 7 mm.

Preferably but not exclusively, the light source includes a laser diode (LD), a light emitting diode (LED), an organic light emitting diode (OLED) and/or a thermal source.

The structured light generation unit 1 further comprises one or more collimating lenses. The light beams from the first light source 11a and the second light source 11b are collimated by the one or more collimating lenses. In this embodiment, the number of the collimating lenses is equal to the number of the light sources and the number of the optical elements. That is, the structured light generation unit 1 comprises two collimating lenses, including a first collimating lens 12a and a second collimating lens 12b. The first collimating lens 12a is arranged between the first light source 11a and the first optical element 13a. After the light beams from the first light source 11a are collimated by the first collimating lens 12a, the collimated light beams are directed to the first optical element 13a. The second collimating lens 12b is arranged between the second light source 11b and the second optical element 13b. After the light beams from the second light source 11b are collimated by the second collimating lens 12b, the collimated light beams are directed to the second optical element 13b. After the light beams pass through the optical elements 13a and 13b, the first structured light pattern S1 and the second structured light pattern S2 are formed on different positions of the projection surface P.

In an embodiment, the lighting apparatus further comprises a sensing unit A. Alternatively, in another embodiment, the lighting apparatus is electrically connected with an external sensing unit A. The sensing unit A is used for sensing the first structured light pattern S1 and the second structured light pattern S2 on different positions of the projection surface P, thereby generating a sensing signal. The sensing signal is transmitted to the controlling unit 2 for comparison. According to the comparing result, the spatial information can be precisely calculated. Moreover, according to the sensing signal, the controlling unit 2 is programmable to turn on and turn off the light sources 11a and 11b.

Figure 3:
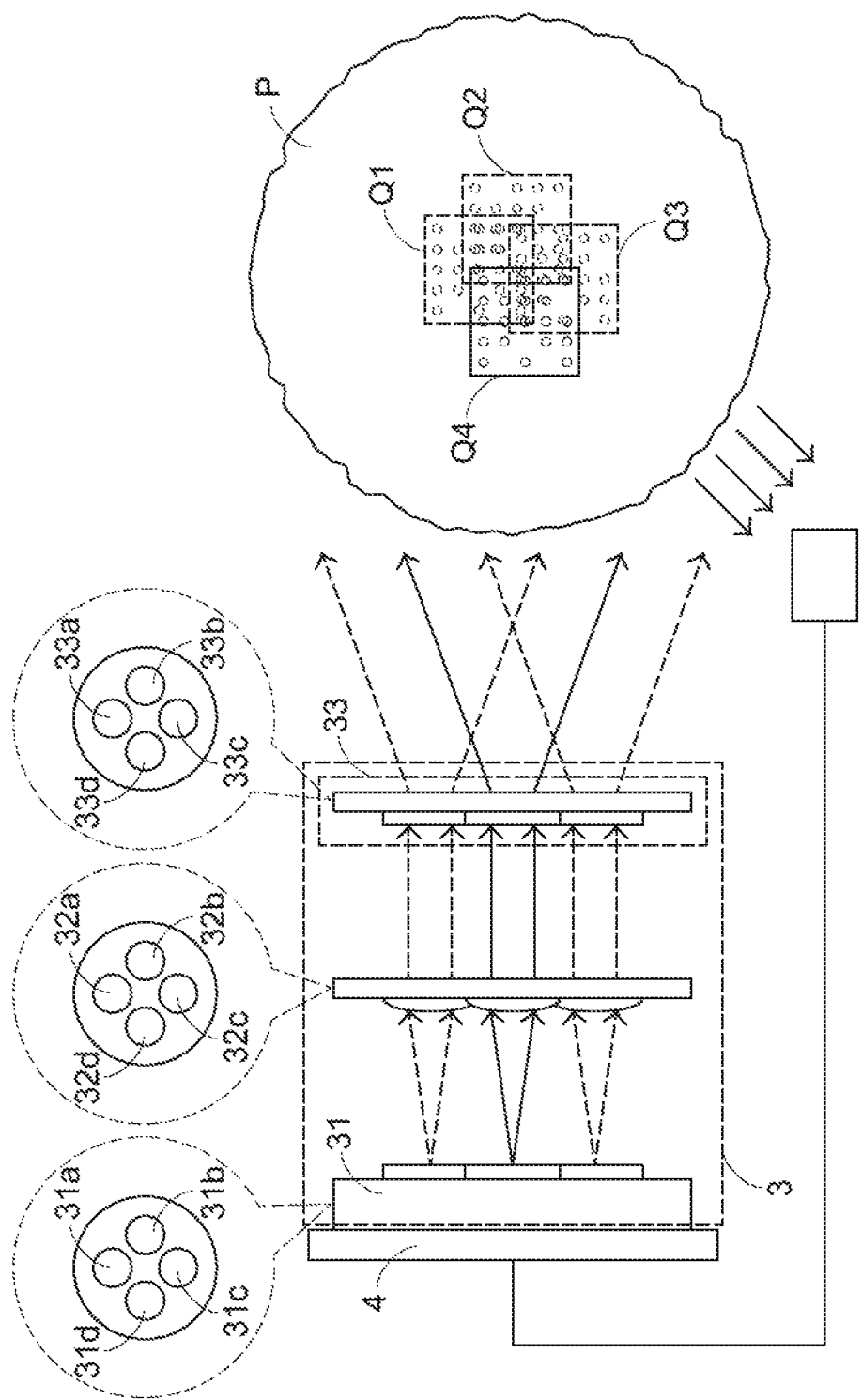
FIG. 3 schematically illustrates the operating concept of a lighting apparatus according to a second embodiment of the present invention.

FIG. 3 schematically illustrates the operating concept of a lighting apparatus according to a second embodiment of the present invention. Like the first embodiment, the lighting apparatus of the second embodiment comprises a structured light generation unit 3 and a controlling unit 4. The controlling unit 4 is in communication with the structured light generation unit 3 in order to control the lighting sequence of the structured light generation unit 3. The structured light generation unit 3 comprises plural light sources 31a~31d and an optical element group 33. After the light beams generated by each of the light sources 31a~31d pass through the optical element group 33, a corresponding structured light pattern is projected out. In this embodiment, the plural light sources comprise the four light sources. These four light sources include a first light source 31a, a second light source 31b, a third light source 31c and a fourth light source 31d, which are arranged on a circuit substrate 31 in a circular permutation. After the light beams from the four light sources 31a, 31b, 31c and 31d pass through the optical element group 33, corresponding structured light patterns are respectively projected on four positions of the projection surface P.

In an embodiment, the controlling unit 4 is programmable to alternately and periodically turn on and turn off the light sources 31a~31d along a circular direction. Consequently, a first structured light pattern Q1, a second structured light pattern Q2, a third structured light pattern Q3 and a fourth structured light pattern Q4 are alternately projected on the projection surface P along a circular direction. Alternatively, the controlling unit 4 is programmable to alternately and periodically turn on and turn off the light sources 31a-31d not along the circular direction (i.e., in a random manner). Consequently, a first structured light pattern Q1, a second structured light pattern Q2, a third structured light pattern Q3 and a fourth structured light pattern Q4 are alternately projected on the projection surface P not along a circular direction (i.e., in a random manner).

Figure 4:
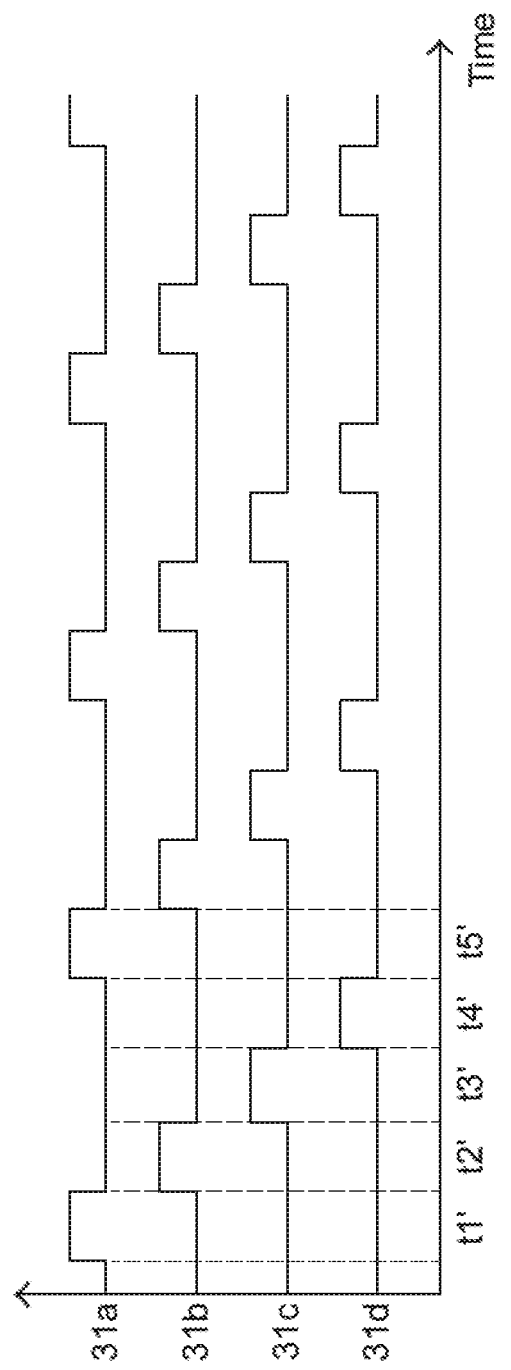
FIG. 4 is a schematic timing waveform diagram illustrating the on/off states of the four light sources of the lighting apparatus according to the second embodiment of the present invention.

Hereinafter, the method of controlling the first light source 31a, the second light source 31b, the third light source 31c and the fourth light source 31d to emit light beams according to the time sequence will be illustrated with reference to FIG. 4. FIG. 4 is a schematic timing waveform diagram illustrating the on/off states of the four light sources of the lighting apparatus according to the second embodiment of the present invention. In the time interval t1', the first light source 31a is in the on state, and the other three light sources 31b, 31c and 31d are in the off state. In the time interval t2', the second light source 31b is in the on state, and the other three light sources 31a, 31c and 31d are in the off state. In the time interval t3', the third light source 31c is in the on state, and the other three light sources 31a, 31b and 31d are in the off state. In the time interval t4', the fourth light source 31d is in the on state, and the other three light sources 31a, 31b and 31c are in the off state. In the time interval t5', the first light source 31a is in the on state, and the other three light sources 31b, 31c and 31d are in the off state. Consequently, these light sources alternately emit light beams according to this time sequence. In other words, the first structured light pattern Q1, the second structured light pattern Q2, the third structured light pattern Q3 and the fourth structured light pattern Q4 are alternately projected on the first position, the second position, the third position and the fourth position of the projection surface P. In this embodiment, the time intervals corresponding to the on states of the first light source 31a, the second light source 31b, the third light source 31c and the fourth light source 31d are not overlapped with each other. It is noted that numerous modifications and alterations may be made while retaining the teachings of the invention. For example, in some embodiments, the time intervals corresponding to the on states of the first light source 31a, the second light source 31b, the third light source 31c and the fourth light source 31d are partially overlapped with each other.

Like to the first embodiment, the optical element group 33 of this embodiment comprises one or more optical elements. After the light beams from each of the light sources 31a~31d pass through the corresponding optical element, the light beams are projected out to generate the corresponding structured light pattern. In this embodiment, the number of optical elements is equal to the number of the light sources. That is, the optical element group 33 comprises four optical elements 33a~33d. The light sources 31a~31d are aligned with the optical elements 33a~33d, respectively. Moreover, the profiles of the structured light patterns are determined according to the patterns of the optical elements 33a~33d. In this embodiment, each of the structured light patterns is illustrated with plural distributed dots. Since the positions of the first light source 31a, the second light source 31b, the third light source 31c and the fourth light source 31d are different, the first structured light pattern Q1, the second structured light pattern Q2, the third structured light pattern Q3 and the fourth structured light pattern Q4 are projected on different positions of the projection surface P.

The structured light generation unit 3 further comprises one or more collimating lenses. The light beams from the light sources are collimated by the corresponding collimating lenses. In this embodiment, the number of the collimating lenses is equal to the number of the light sources and the number of the optical elements. That is, the structured light generation unit 3 comprises four collimating lenses 32a~32d. The first collimating lens 32a is arranged between the first light source 31a and the first optical element 33a for collimating the light beams from the first light source 31a and directing the collimated light beams to the first optical element 33a. The second collimating lens 32b is arranged between the second light source 31b and the second optical element 33b for collimating the light beams from the second light source 31b and directing the collimated light beams to the second optical element 33b. The third collimating lens 32c is arranged between the third light source 31c and the third optical element 33c for collimating the light beams from the third light source 31c and directing the collimated light beams to the third optical element 33c. The fourth collimating lens 32d is arranged between the fourth light source 31d and the fourth optical element 33d for collimating the light beams from the fourth light source 31d and directing the collimated light beams to the fourth optical element 33d. After the light beams pass through the optical elements 33a~33d, the light beams are projected out.

Figure 5:
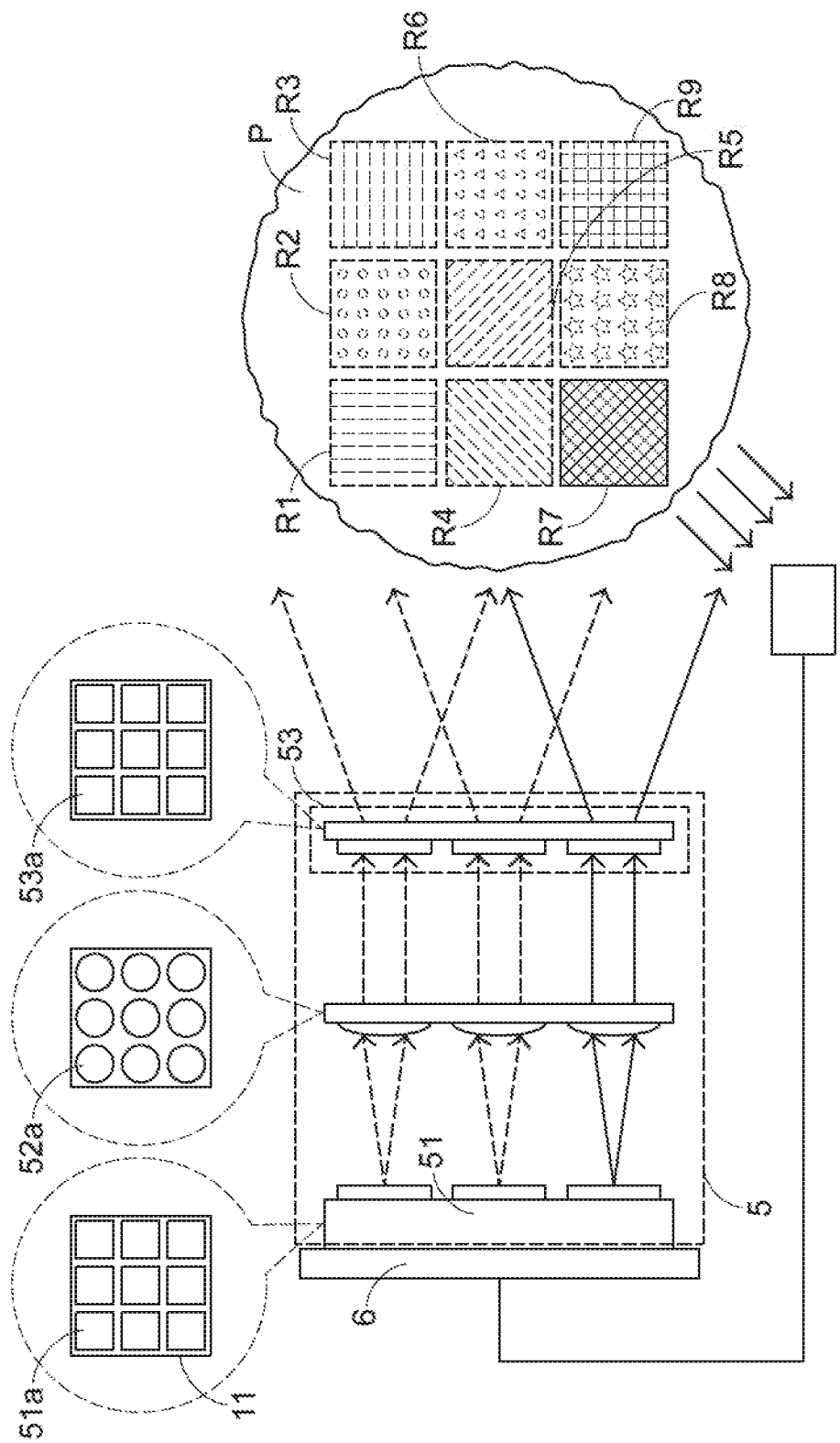
FIG. 5 schematically illustrates the operating concept of a lighting apparatus according to a third embodiment of the present invention.

FIG. 5 schematically illustrates the operating concept of a lighting apparatus according to a third embodiment of the present invention. Like the first embodiment, the lighting apparatus of the third embodiment comprises a structured light generation unit 5 and a controlling unit 6. The controlling unit 6 is in communication with the structured light generation unit 5 in order to control the lighting sequence of the structured light generation unit 5. The structured light generation unit 5 comprises plural light sources 51a and an optical element group 53. After the light beams generated by each of the light sources 51a pass through the optical element group 53, a corresponding structured light pattern is projected out. In comparison with the first embodiment, the structured light generation unit 5 of this embodiment comprises nine light sources 51a. These nine light sources 51a are arranged on a circuit substrate 51 in an array. The controlling unit 6 is programmable to turn on and turn off these light sources 51a according to a lighting sequence. Consequently, different structured light patterns are respectively projected on different positions of the projection surface P according to the lighting sequence.

Like to the first embodiment, the optical element group 53 of this embodiment comprises one or more optical elements 53a. After the light beams from each of the light sources 51a pass through the one or more optical elements, the light beams are projected out to generate the corresponding structured light pattern. In this embodiment, the number of optical elements 53a is equal to the number of the light sources 51a. That is, the optical element group 53 comprises nine optical elements 53a. The light sources 51a are aligned with the optical elements 53a, respectively. Moreover, the profiles of the structured light patterns are determined according to the patterns of the optical elements 53a. In this embodiment, after the light beams from the light sources 51a pass through the corresponding optical elements 53a, the generated structured light patterns have different profiles. It is noted that numerous modifications and alterations may be made while retaining the teachings of the invention. For example, in another embodiment, after the light beams from the light sources 51a pass through the corresponding optical elements 53a, the profiles of the generated structured light patterns are identical. In a further embodiment, after the light beams from the light sources 51a pass through the corresponding optical elements 53a, the profiles of at least two of the generated structured light patterns are identical.

The structured light generation unit 5 further comprises one or more collimating lenses 52a. The light beams from the light sources 51a are collimated by the corresponding collimating lenses 52a. In this embodiment, the number of the collimating lenses 52a is equal to the number of the light sources 51a and the number of the optical elements 53a. That is, the structured light generation unit 5 comprises nine collimating lenses 52a. Each of the collimating lenses 52a is arranged between the corresponding light source 51a and the corresponding optical element 53a for collimating the light beams from the corresponding light source 51a and directing the collimated light beams to the corresponding optical element 53a.

In this embodiment, the plural light sources 51 are arranged in a 3×3 array. Consequently, the arrangement of the light sources 51a contains a linear permutation (e.g., the upper row of the 3×3 array). In an embodiment, the controlling unit 6 is programmable to alternately and periodically turn on and turn off the light sources 51 along a linear direction. Alternatively, the controlling unit 6 is programmable to alternately and periodically turn on and turn off the light sources 51 not along a linear direction.

Figure 6:
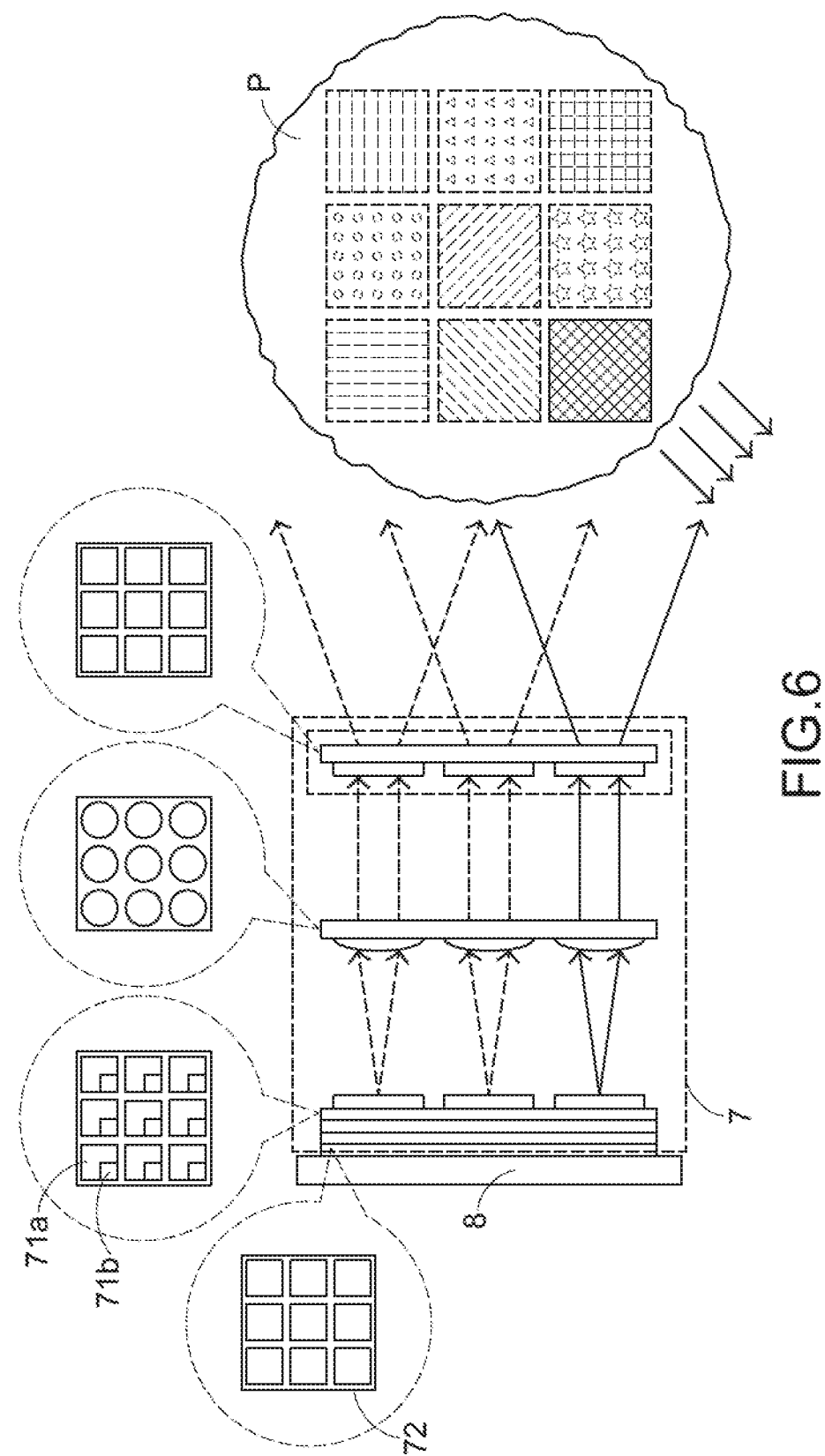
FIG. 6 schematically illustrates the operating concept of a lighting apparatus according to a fourth embodiment of the present invention.

FIG. 6 schematically illustrates the operating concept of a lighting apparatus according to a fourth embodiment of the present invention. Like the third embodiment, the lighting apparatus of the fourth embodiment comprises a structured light generation unit 7 and a controlling unit 8. In comparison with the third embodiment, each light source 71 is equipped with a sensor 71b. After the structured light pattern projected out from the corresponding light source 71a is sensed by the corresponding sensor 71b, a sensing signal is issued from the sensor 71b to the controlling unit 8. The light sources 71a and the sensors 71b are disposed on a circuit protection layer 72. The light sources 71a and the sensors 71b are electrically connected with the circuit protection layer 72. The circuit protection layer 72 can provide a good protective shielding function, provide an electrical connection function or stabilize the working temperatures of components. The plural light sources 71a are thermally stabilized by the circuit protection layer 72, or the plural light sources 71a are not thermally stabilized by the circuit protection layer 72. In some other embodiments, the controlling unit and the light sources are disposed on the same circuit protection layer.

Figure 7:
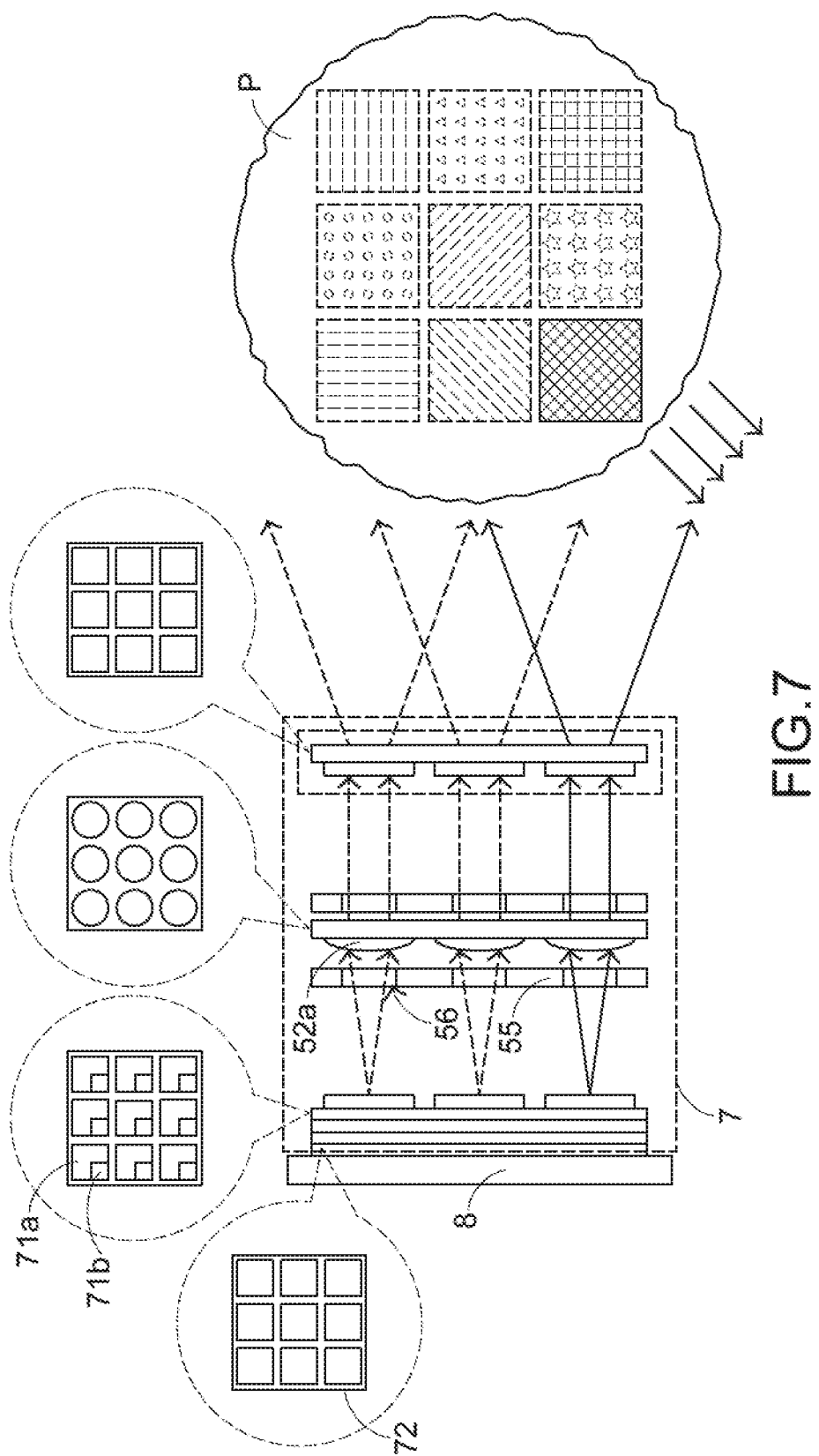
FIG. 7 schematically illustrates a preferred embodiment of a lighting apparatus according to the fourth embodiment of the present invention.

Furthermore, the lighting apparatus may further comprise at least one optically-absorbed element 55 for stray light reduction, as FIG. 7 shows. The optically-absorbed element 55 has a body and a plurality of apertures 56 formed on the body, the apertures 56 are corresponding to the collimating lens 52a while the optically-absorbed element 55 is aside by the collimating lens 52a. With such an arrangement, the generality light beams are allowed to pass via the apertures 56 of the optically-absorbed element 55 and minor stray light beams would be absorbed by the body. Besides, optically-absorbed element 55 could be well substituted by a non-optical element.

Figure 8:
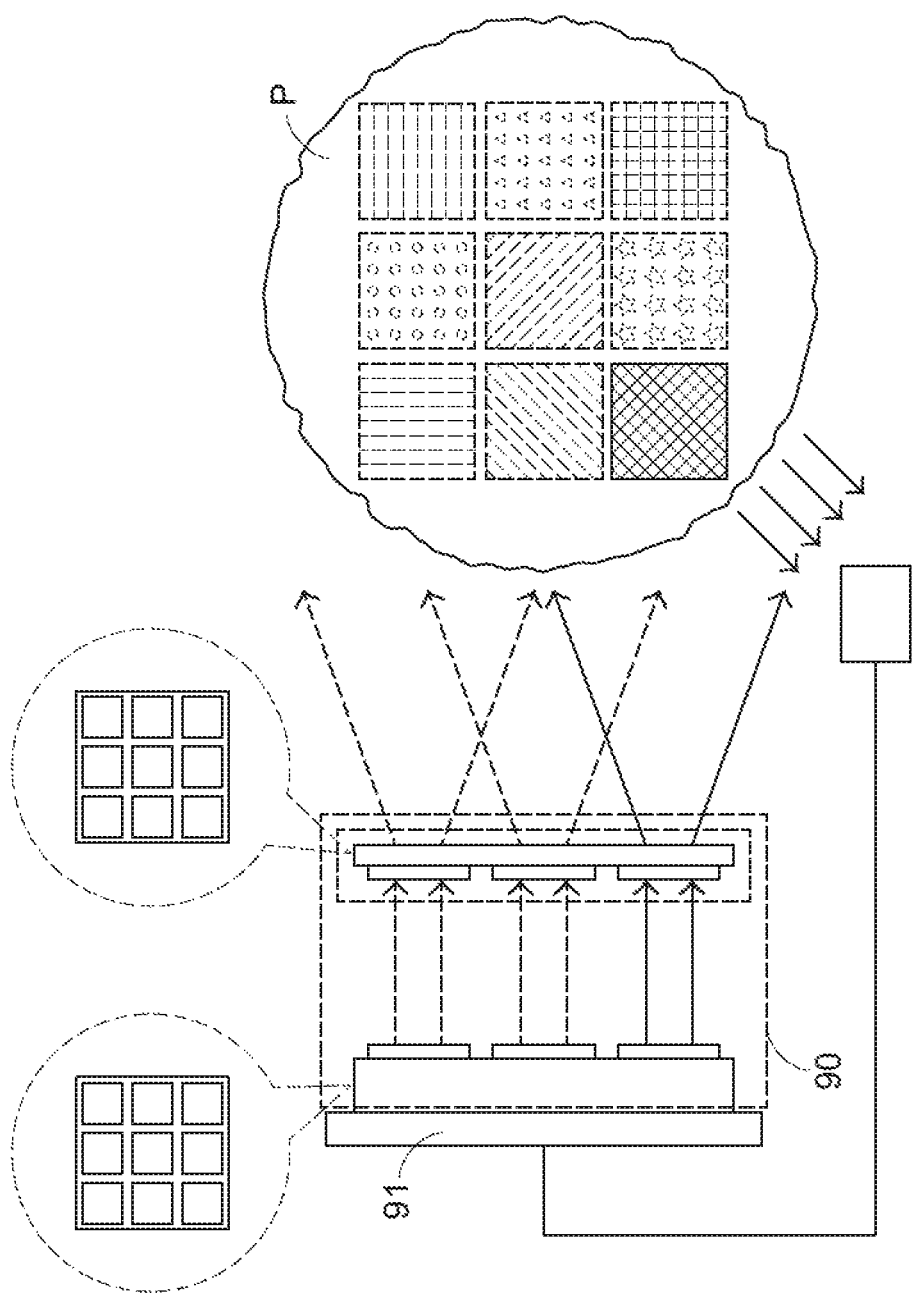
FIG. 8 schematically illustrates the operating concept of a lighting apparatus according to a fifth embodiment of the present invention.

FIG. 8 schematically illustrates the operating concept of a lighting apparatus according to a fifth embodiment of the present invention. Like the third embodiment, the lighting apparatus of the fifth embodiment comprises a structured light generation unit 90 and a controlling unit 91. In comparison with the fifth embodiment, the structured light generation unit 90 is not equipped with the collimating lenses. Since the collimating lenses are omitted, the overall thickness of the lighting apparatus is reduced. Consequently, the lighting apparatus can be installed more flexibly.

Figure 9:
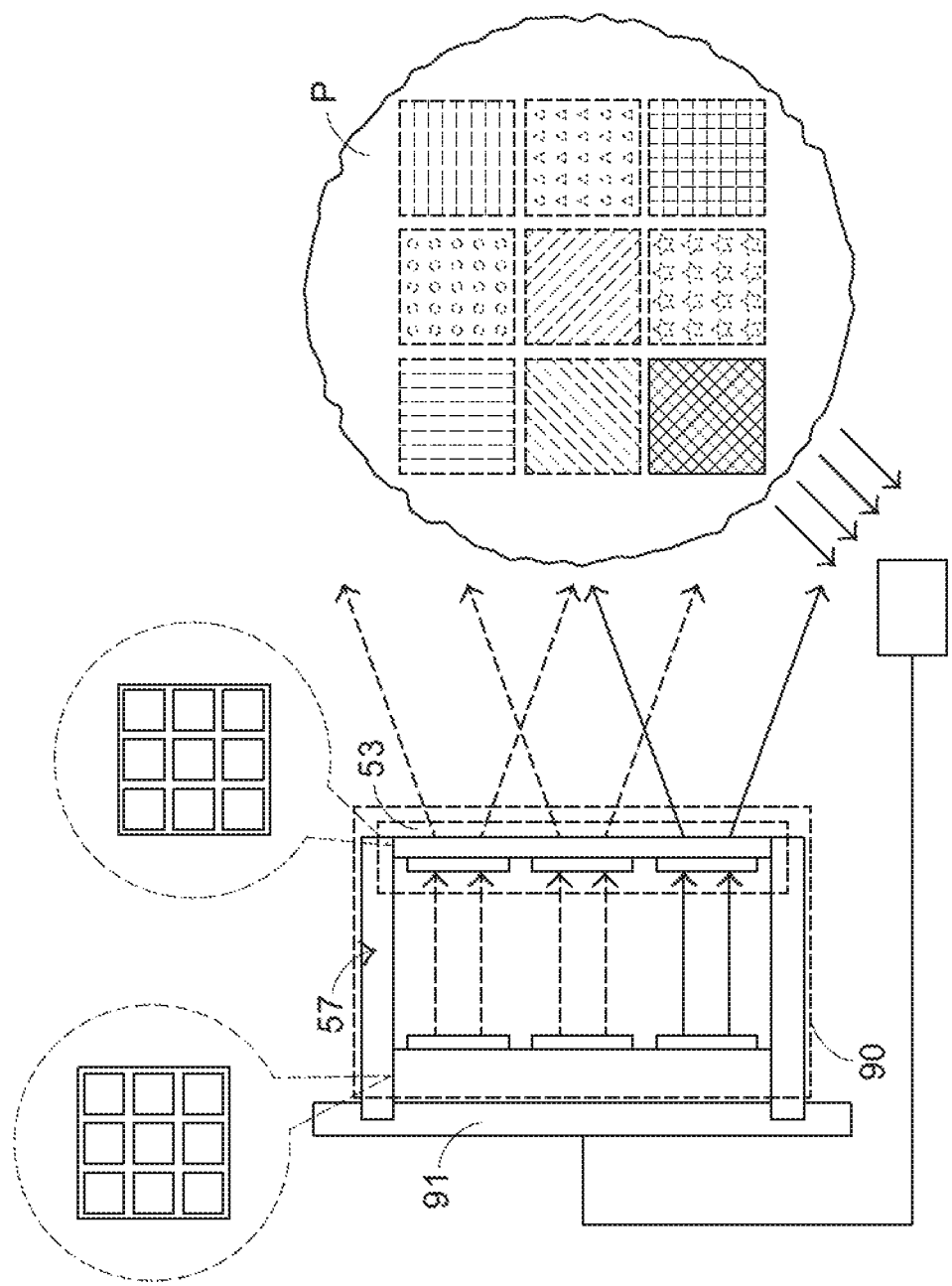
FIG. 9 schematically illustrates the operating concept of a lighting apparatus according to a sixth embodiment of the present invention.
Figure 10:
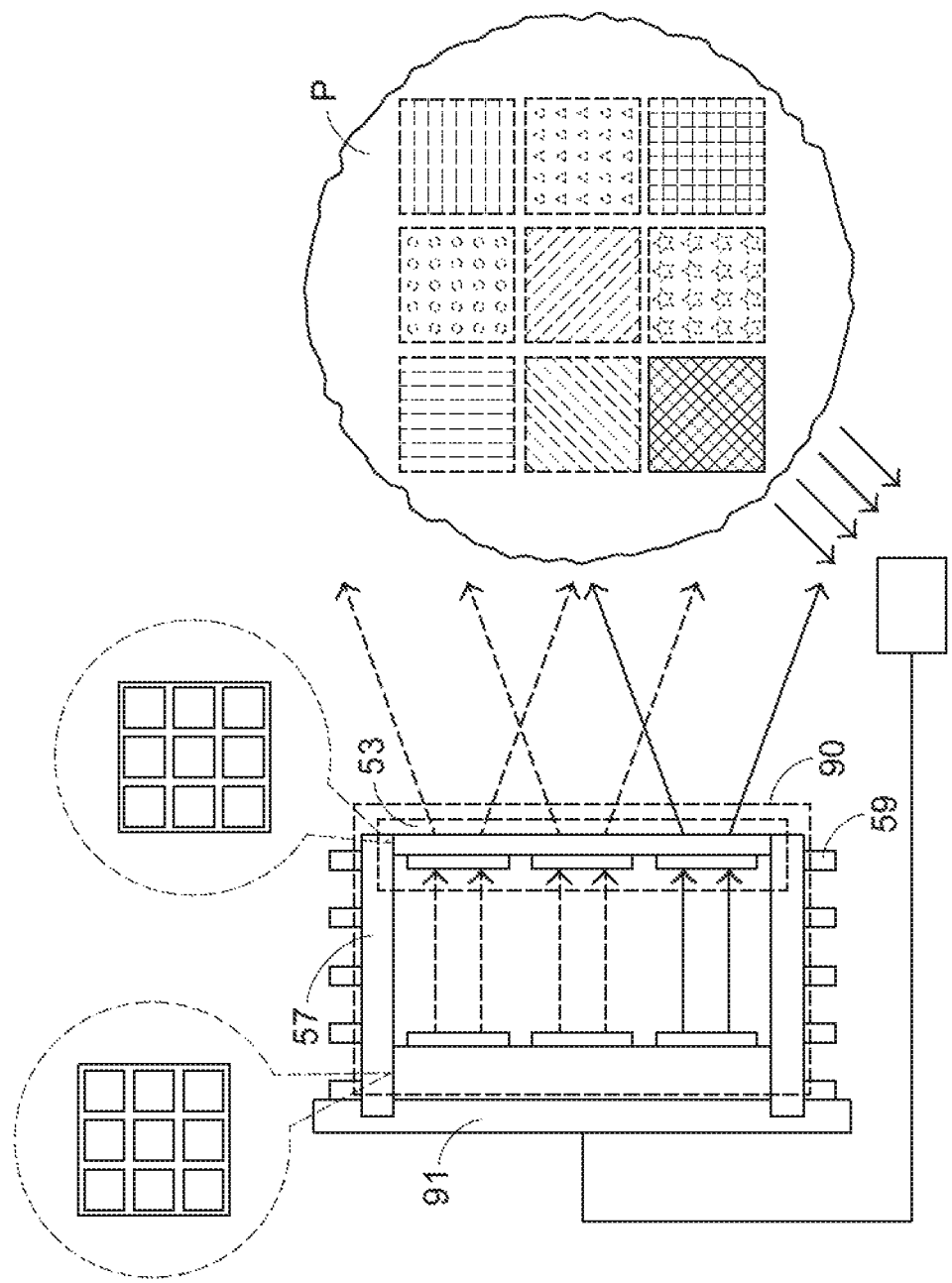
FIG. 10 schematically illustrates a preferred embodiment of a lighting apparatus according the sixth embodiment of the present invention.

FIG. 9 and FIG. 10 schematically illustrate the operating concept of a lighting apparatus according to a sixth embodiment of the present invention. Like the fifth embodiment, the lighting apparatus of the sixth embodiment further comprises a casing 57, and the optical element group 53 and the casing 57 are integrally formed by inserted molding, two color molding, UV light curving, or thermal curving and thermally resistant to a high temperature in a reflow process.

Furthermore, the body of casing 57 is used for stray light reduction, and is with alignment pins or a mechanical structure for hardness enhancement. The body of casing 57 is wrapped by a mechanical structure 59 to enhance the strength of entire mechanical structure. Besides, the body of the casing 57 may be doping with electromagnetic interference reduction materials for a better performance.

From the above descriptions, the lighting apparatus comprises plural light sources that are programmable to emit light beams. According to a time sequence, the structured light patterns are sequentially projected on different positions of the projection surface, or the structured light patterns have different profiles. Consequently, the structured light pattern can provide sufficient resources for precisely calculating the spatial information in order to increase the resolution. Under this circumstance, the applications of the structured light pattern are expanded. In comparison with the conventional technology of using the microelectromechanical system to drive the movable optical module, the lighting apparatus of the present invention does not need moving parts. Consequently, the power consumption is largely reduced, the assembling yield is increased, the durability is enhanced, and the overall volume is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A lighting apparatus, comprising:
   a structured light generation unit comprising plural light sources, plural collimating lenses and an optical element group, wherein the collimating lenses are arranged between the light sources and the optical element group, after plural light beams from the corresponding light sources are collimated by the corresponding collimating lens and then passing through the optical element group, a first structured light pattern corresponding to a first light source of the plural light sources is projected on a first position of a projection surface and a second structured light pattern corresponding to a second light source of the plural light sources is projected on a second position of the projection surface, wherein the first position and the second position are different; and
   a controlling unit in communication with the structured light generation unit, wherein the controlling unit controls the first light source and the second light source to emit the light beams according to a time sequence, so that the first structured light pattern and the second structured light pattern are projected on the projection surface according to the time sequence.

2. The lighting apparatus according to claim 1, wherein the controlling unit is programmable to turn on and turn off each of the plural light sources.

3. The lighting apparatus according to claim 2, wherein the plural light sources are arranged in a linear permutation, and the plural light sources are alternatively and periodically turned on and turned off along a sequence of the linear permutation under control of the controlling unit; or the plural light sources are arranged in a linear permutation, and the plural light sources are periodically turned on and turned off not along a sequence of the linear permutation under control of the controlling unit.

4. The lighting apparatus according to claim 2, wherein the plural light sources are arranged in a circular permutation, and the plural light sources are alternatively and periodically turned on and turned off along a sequence of the circular permutation under control of the controlling unit; or the plural light sources are arranged in a circular permutation, and the plural light sources are periodically turned on and turned off not along a sequence of the circular permutation under control of the controlling unit.

5. The lighting apparatus according to claim 2, wherein the plural light sources are regularly arranged on a two-dimensional plane, or the plural light sources are regularly arranged on a three-dimensional curvy surface or in a three-dimensional space.

6. The lighting apparatus according to claim 1, wherein the light source includes a laser diode, a light emitting diode, an organic light emitting diode and/or a thermal source.

7. The lighting apparatus according to claim 1, wherein the optical element group comprises plural optical elements corresponding to the first structured light pattern and the second structured light pattern, wherein each of the plural optical elements comprises a diffractive optical element, a refractive optical element or a reflective optical element.

8. The lighting apparatus according to claim 7, wherein the refractive optical element is a multi-aperture lens, a lenticular lens or a lens array.

9. The lighting apparatus according to claim 7, wherein a number of the plural optical elements is equal to a number of the plural light sources, and the plural optical elements are aligned with the plural light sources, respectively.

10. The lighting apparatus according to claim 7, wherein a number of the plural non-optical elements or optically-absorbed elements are inserted correspondingly with a number of the plural light sources and the plural optical elements to block the stray light respectively.

11. The lighting apparatus according to claim 1, wherein the lighting apparatus further comprises a casing, and the optical element group and the casing are integrally formed by inserted molding, two color molding, UV light curving, or a thermal curving.

12. The lighting apparatus according to claim 1, wherein a linear distance between a light-outputting side of the optical element group and the plural light sources is smaller than 7 mm, or an overall height of the lighting apparatus is smaller than 7 mm.

13. The lighting apparatus according to claim 1, wherein the lighting apparatus further comprises a casing, and the optical element group is supported by a casing, wherein there is a fixed relative configuration or a fixed distance between the optical element group and the plural light sources, or the relative configuration or the relative distance between the optical element group and the plural light sources is adjusted in a programmable manner.

14. The lighting apparatus according to claim 1, wherein the lighting apparatus further comprises a sensing unit, wherein after the first structured light pattern and the second structured light pattern on different positions of the projection surface are sensed by the sensing unit, a sensing signal is generated by the sensing unit.

15. The lighting apparatus according to claim 14, wherein the controlling unit is programmable to turn on and turn off each of the plural light sources according to the sensing signal.

16. The lighting apparatus according to claim 1, wherein the plural light sources are disposed on a circuit protection layer, and the plural light sources are electrically connected with the circuit protection layer, wherein the plural light sources are thermally stabilized by the circuit protection layer, or the plural light sources are not thermally stabilized by the circuit protection layer.

17. The lighting apparatus according to claim 1, wherein the plural light sources and the controlling unit are disposed on a circuit protection layer, and the plural light sources and the controlling unit are electrically connected with the circuit protection layer, wherein the plural light sources and the controlling unit are thermally stabilized by the circuit protection layer, or the plural light sources and the controlling unit are not thermally stabilized by the circuit protection layer.

18. The lighting apparatus according to claim 1, wherein the plural light sources and the controlling unit are disposed on a circuit protection layer, the plural light sources and the controlling unit are electrically connected with the circuit protection layer, and at least one sensor is disposed on the circuit protection layer for generating a sensing signal to the controlling unit, wherein the plural light sources, the controlling unit and the at least one sensor are thermally stabilized by the circuit protection layer, or the plural light sources, the controlling unit and the at least one sensor are not thermally stabilized by the circuit protection layer.

19. The lighting apparatus according to claim 11, wherein the body of casing with mechanical structure is used for stray light reduction.

20. The lighting apparatus according to claim 11, wherein the optical element group and the casing are integrally formed by inserted molding, two color molding, UV light curving, or a thermal curving and thermally resistant to a high temperature in a reflow process.

21. The lighting apparatus according to claim 11, wherein the optical element group is a film or thin optical element which is comprised of a surface of collimating lens array or microlens array while on the other side is a surface of diffractive element array.

22. The lighting apparatus according to claim 21, wherein the thickness of the optical element group is less than 0.4 mm.

23. The lighting apparatus according to claim 11, wherein the body of casing is with alignment pins or a mechanical structure for hardness enhancement.

24. The lighting apparatus according to claim 11, wherein the body of the casing is doping with electromagnetic interference reduction materials.

* * * * *